US009909559B2

(12) United States Patent
Lohan et al.

(10) Patent No.: US 9,909,559 B2
(45) Date of Patent: Mar. 6, 2018

(54) UPTOWER WIND TURBINE COMPONENT REPLACEMENT

(71) Applicant: Inventus Holdings, LLC, Juno Beach, FL (US)

(72) Inventors: Martin E. Lohan, Palm City, FL (US); Per Eske Fenger, Terndrup (DK); Charles Asheim, Palm Beach Gardens, FL (US); Miguel A. Gonzalez, Jupiter, FL (US); Daniel M. Brake, Hobe Sound, FL (US)

(73) Assignee: Inventus Holdings, LLC, Juno Beach, FL (US)

( * ) Notice: Subject to any disclaimer, the term of this patent is extended or adjusted under 35 U.S.C. 154(b) by 0 days.

(21) Appl. No.: 14/507,429

(22) Filed: Oct. 6, 2014

(65) Prior Publication Data

US 2015/0096174 A1    Apr. 9, 2015

Related U.S. Application Data

(60) Provisional application No. 61/886,985, filed on Oct. 4, 2013.

(51) Int. Cl.
*F03D 1/00* (2006.01)
*F03D 80/50* (2016.01)
*F03D 80/70* (2016.01)

(52) U.S. Cl.
CPC ............. *F03D 1/003* (2013.01); *F03D 80/50* (2016.05); *F03D 80/70* (2016.05);
(Continued)

(58) Field of Classification Search
CPC ........ B23P 6/005; F03D 1/003; F03D 11/045; F05B 2230/80; F05B 2230/70; F05B 2230/60; F05B 2230/61
See application file for complete search history.

(56) References Cited

U.S. PATENT DOCUMENTS 5,582,413 A * 12/1996 Lendway ............... F16J 15/443
                                            277/412
2003/0086631 A1 * 5/2003 Faltus ..................... F16C 23/10
                                            384/559

(Continued)

FOREIGN PATENT DOCUMENTS

DE    20116649 U1 * 1/2002   ............. F16C 35/06
EP    2573036        3/2013
(Continued)

OTHER PUBLICATIONS

Machine translation of JP 2008-032147 A1.*
(Continued)

*Primary Examiner* — Christopher Besler
(74) *Attorney, Agent, or Firm* — Jon Gibbons; Fleit Gibbons Gutman; Bongini & Bianco P.L.

(57) ABSTRACT

A method for performing uptower maintenance of a wind turbine in order to replace the main bearing on the turbine shaft is disclosed. Embodiments of this method to perform maintenance may include installing a rotor lock to resist rotation of the main shaft during maintenance, providing a lifting device in order to elevate the main shaft, removing the main bearing from its main bearing housing, and installing a replacement split main bearing. A crane may also be installed uptower to assist in the maintenance.

18 Claims, 6 Drawing Sheets

FIG. 4

(52) U.S. Cl.
CPC ....... *F05B 2230/80* (2013.01); *F05B 2240/50* (2013.01); *Y02B 10/30* (2013.01); *Y02E 10/721* (2013.01); *Y02E 10/726* (2013.01); *Y02P 70/523* (2015.11); *Y10T 29/49318* (2015.01)

(56) References Cited

U.S. PATENT DOCUMENTS

| | | | |
|---|---|---|---|
| 2010/0021278 A1 | 1/2010 | Stegemann | |
| 2011/0110769 A1* | 5/2011 | Stiesdal | F03D 1/003 415/170.1 |
| 2011/0133473 A1 | 6/2011 | Signore et al. | |
| 2011/0135481 A1 | 6/2011 | Koronkiewicz | |
| 2011/0250077 A1 | 10/2011 | Pedersen | |
| 2014/0017047 A1* | 1/2014 | Bitsch | F03D 1/001 414/561 |
| 2015/0026979 A1* | 1/2015 | Muller | B25B 27/06 29/889.1 |

FOREIGN PATENT DOCUMENTS

| | | | |
|---|---|---|---|
| JP | 2008032147 | 2/2008 | |
| WO | WO 2007/111517 A2 | 10/2007 | |
| WO | WO 2012/079579 A1 * | 6/2012 | ............. F03D 11/00 |
| WO | WO 2012/105971 A1 | 8/2012 | |
| WO | WO 2013/098028 A1 * | 7/2013 | ............. F01D 5/005 |

OTHER PUBLICATIONS

International Searching Authority/US, International Search Report and Written Opinion issued in International Application No. PCT/US14/59349, dated Jan. 7, 2015.

European Search Report for European Patent Application No. 14850130.7 dated May 29, 2017.

* cited by examiner

UPTOWER WIND TURBINE COMPONENT REPLACEMENT

CROSS REFERENCE TO RELATED APPLICATIONS

This application claims the benefit of U.S. Provisional Application No. 61/886,985 filed Oct. 4, 2013, the disclosure of which is hereby incorporated herein by reference in its entirety.

BACKGROUND

Wind turbine technology is providing an ever-increasing proportion of the electrical energy generated in the United States and worldwide. Wind turbines transform kinetic energy, provided by a wind source, into mechanical energy, which may in turn be used to produce electricity. A typical wind turbine consists of an electrical generator mounted in a nacelle atop a tower that may be sixty (60) or more meters tall. The generator is powered by wind, which rotates the turbine blades, which are connected to a drive train assembly, the drive train assembly including a main shaft connected to the blades, a main shaft bearing, and a gear box which increases the shaft speed passed to the generator. Like the generator, the drive train assembly is usually mounted in the nacelle. It is well understood that one method for increasing the rated electrical output of a wind turbine is to increase the diameter of the main shaft, which may well exceed a diameter of one (1) meter. As turbines are manufactured with larger main shafts, the other components in the nacelle may necessarily also increase in size, including the nacelle itself.

As with most mechanical machinery, periodic maintenance, refurbishing or repair is needed for wind turbines, including the main shaft bearing. Presently, whenever a main bearing fails or otherwise requires replacement or maintenance, a large crane is used to first retract the nacelle roof, then remove an associated rotor assembly, and lastly extract the entire drive train assembly. When the drive train assembly reaches the ground, the gearbox may be unmated from the main shaft. The main shaft and main bearing are then sent to a repair shop to remove the old bearing and install a new one, often through a press-fit method. The main shaft with the new main bearing may then be mated with the gearbox, and then the crane will install the repaired drive train assembly into the nacelle. The process of removing the entire drive train assembly requires a large crane, which is itself difficult and costly to install. Additional time and expense is incurred by transporting the drive train assembly to an off-site location. Thus, a method for replacing the main bearing uptower is desired, particularly in larger turbines.

BRIEF SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In one embodiment, a method is disclosed for performing maintenance of a wind turbine, the wind turbine including one or more turbine blades connected to a main shaft, and a nacelle housing for enclosing components of the wind turbine including at least a portion of the main shaft and a main bearing, the main bearing fixable to a stationary position with respect to the main shaft by a main bearing housing. The method may include the steps of: installing a rotor lock in order to resist rotation of the main shaft during maintenance of the wind turbine; providing a lifting device in order to elevate the main shaft to a clearance height; removing the main bearing from the main bearing housing; and installing a split main bearing to the main shaft.

DETAILED DESCRIPTION

Figure 1:
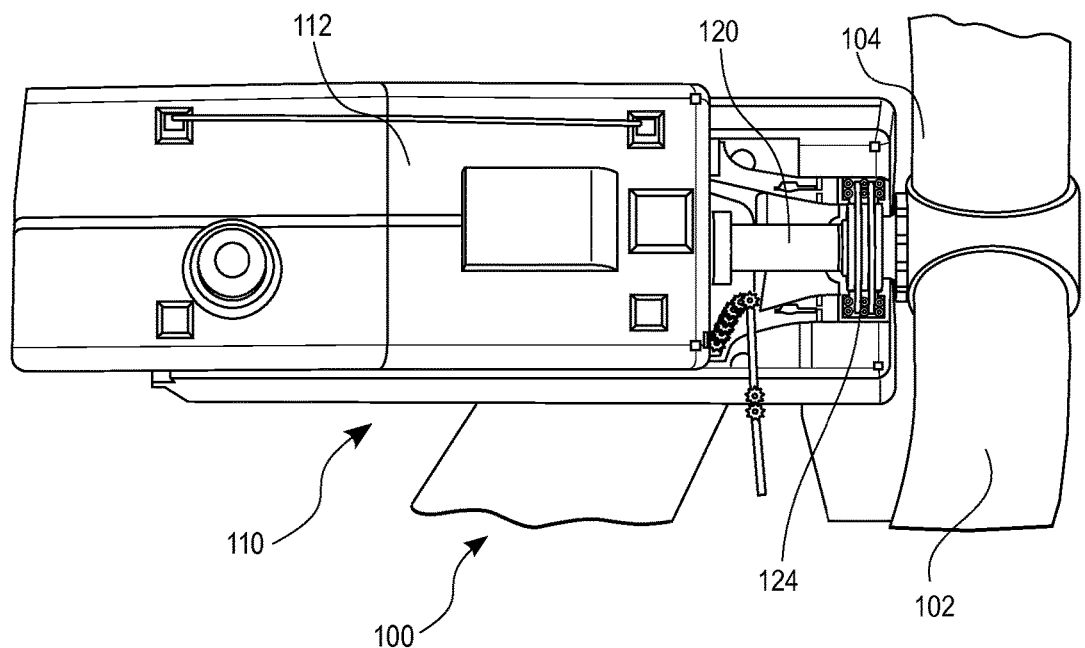
FIG. 1 illustrates a top view of the uptower components of a wind turbine, with the nacelle roof in a partially-retracted position, in accordance with the disclosure.

The following detailed description and the appended drawings describe and illustrate exemplary embodiments of the invention solely for the purpose of enabling one of ordinary skill in the relevant art to make and use the invention. As such, the detailed description and illustration of these embodiments are purely exemplary in nature and are in no way intended to limit the scope of the invention, or its protection, in any manner. It should also be understood that the drawings are not to scale and in certain instances details have been omitted, which are not necessary for an understanding of the present invention, such as conventional details of fabrication and assembly.

Where a turbine may include one or more turbine blades connected to a main shaft and a nacelle housing for enclosing components of the wind turbine including at least a portion of the main shaft and a main bearing, the main bearing fixable to a stationary position with respect to the main shaft by a main bearing housing, a method to perform maintenance of the wind turbine may include the steps of installing a rotor lock in order to resist rotation of the main shaft during maintenance of the wind turbine, providing a lifting device in order to elevate the main shaft to a clearance height, removing the main bearing from the main bearing housing, and installing a split main bearing to the main shaft.

Embodiments of this method to perform maintenance may further include affixing a crane proximate to a portion of the nacelle housing, the crane operable to maneuver and lift components of the wind turbine. The crane may be sectionable into components and the step of affixing the crane may further include assembling the components of the crane uptower. The rotor lock may circumscribe at least a portion of the main shaft when installed. The rotor lock may be installed between the turbine blades and the main bearing housing. The clearance height may be approximately one inch. The maintenance method may further include removing the main bearing housing and providing a replacement main bearing housing for holding the installed split main bearing. After the main bearing and the main bearing housing are removed, and before the replacement bearing housing and split main bearing may be installed, the method may include repairing the main shaft. The repair of the main shaft may include removing damage to the main shaft at or near the surface of the main shaft, and adding material to the main shaft in order to reestablish an operating outer diameter of the main shaft.

In some embodiments, the split main bearing may include a first inner race, and at least one set of rollers, and an outer race. The first inner race, the at least one set of rollers, and the outer race may be each provided as pairs of substantially semi-circular components. The step of installing the split main bearing may include securing the pair of first inner race components about the main shaft, positioning the pair of at least one set of rollers about the first inner race, and securing the pair of outer race components about the at least one set of rollers thereby securing the first race, the at least one set of rollers, and the outer race together about the main shaft.

Embodiments of this method may further include affixing a first crane and at least one additional crane on or proximate to a portion of the nacelle housing, the first crane and at least one additional crane operable to maneuver and lift components of the wind turbine. The first crane may be affixed on or proximate to a portion of the nacelle housing and may be utilized for lifting and positioning the at least one additional crane in order to affix the at least one additional crane on or proximate to a separate portion of the nacelle housing. The at least one additional crane may be divisible into components, and the first crane may be operable to lift and position the components in order to assemble the additional crane. The components of the additional crane may individually weigh 50 lbs or less.

An additional embodiment of performing maintenance of a wind turbine may include affixing a first crane on or proximate to a portion of the nacelle housing, the first crane sectionable into components, affixing a second crane on or proximate to a separate portion of the nacelle housing, portions of the second crane lifted into place using the affixed first crane and the second crane may be operable to maneuver and lift components of the wind turbine, installing a rotor lock between the turbine blades and the main bearing housing in order to resist rotation of the main shaft, the installed rotor lock circumscribing at least a portion of the main shaft, providing a lifting device in order to elevate the main shaft to a clearance height, removing the main bearing housing, removing the main bearing from the main shaft, installing a split main bearing to the main shaft, the split main bearing composed of a plurality of semi-circular components, and providing a replacement main bearing housing for holding the installed split main bearing. Embodiments of methods to perform maintenance of a wind turbine may be performed uptower on the wind turbine. The components of the first crane may each weigh about 50 lbs or less. The maintenance may further include repairing the main shaft after removing the main bearing, and before installing a split main bearing.

Figure 2:
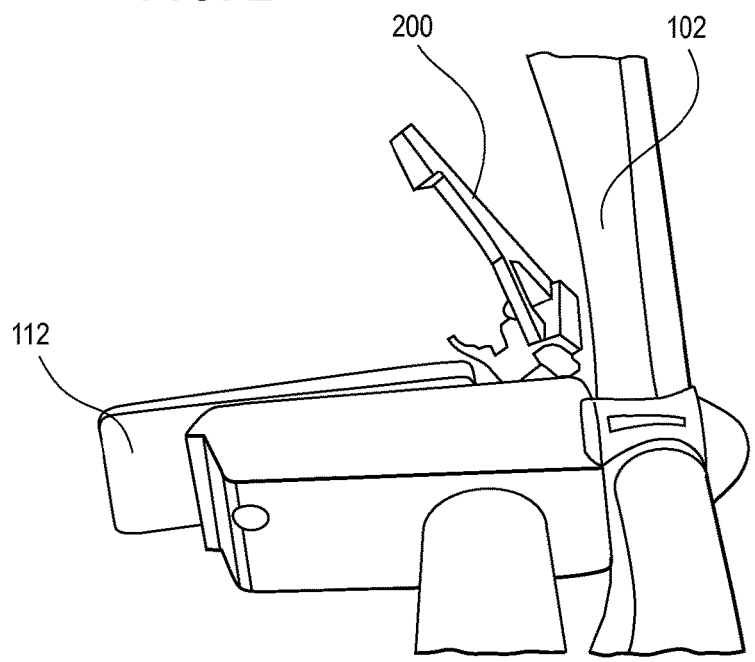
FIG. 2 illustrates a crane mounted uptower to the nacelle housing, in accordance with the disclosure.
Figure 3:
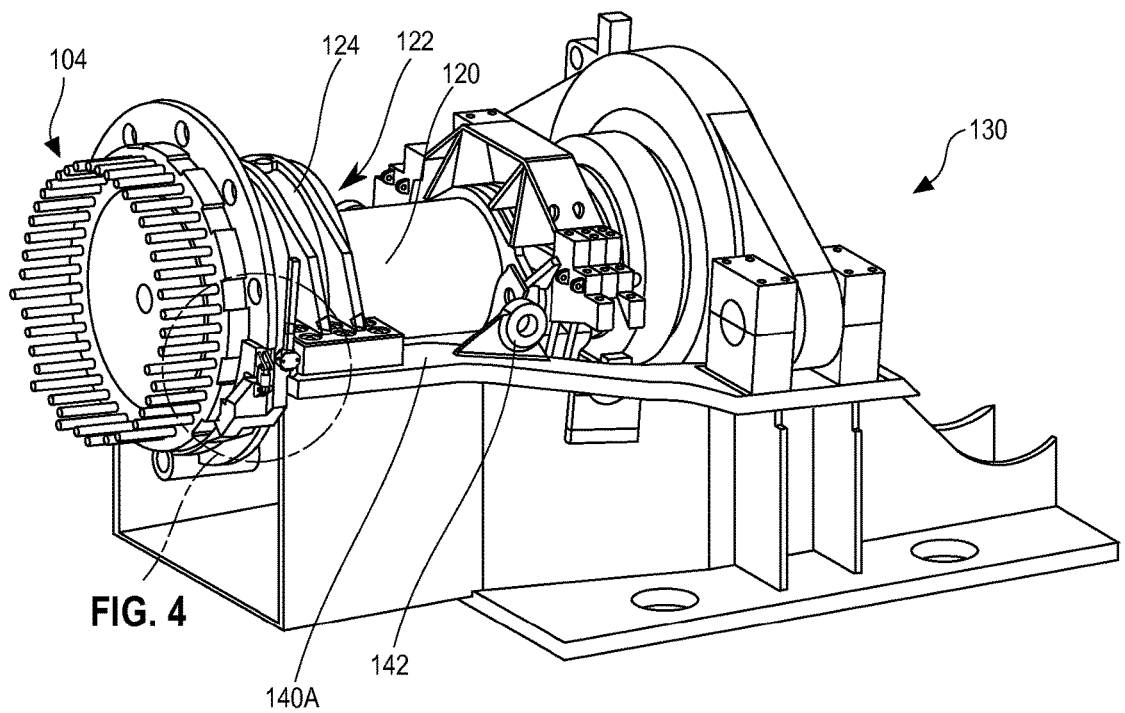
FIG. 3 illustrates an embodiment of a gear train removed from the wind turbine.
Figure 4:
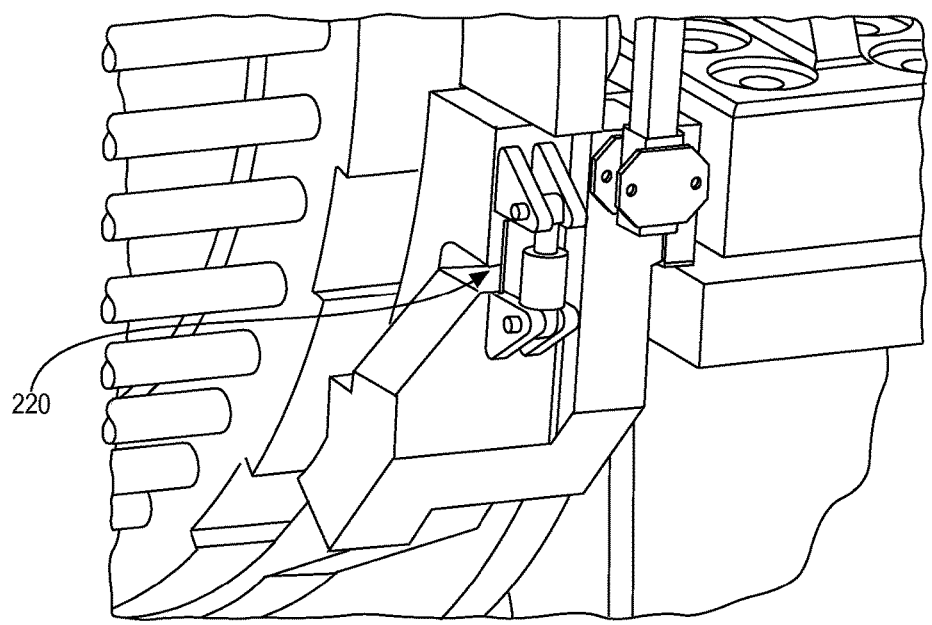
FIG. 4 illustrates an enhanced view of a section of the gear train of FIG. 3 showing a shaft lifting device in accordance with the disclosure.
Figure 5:
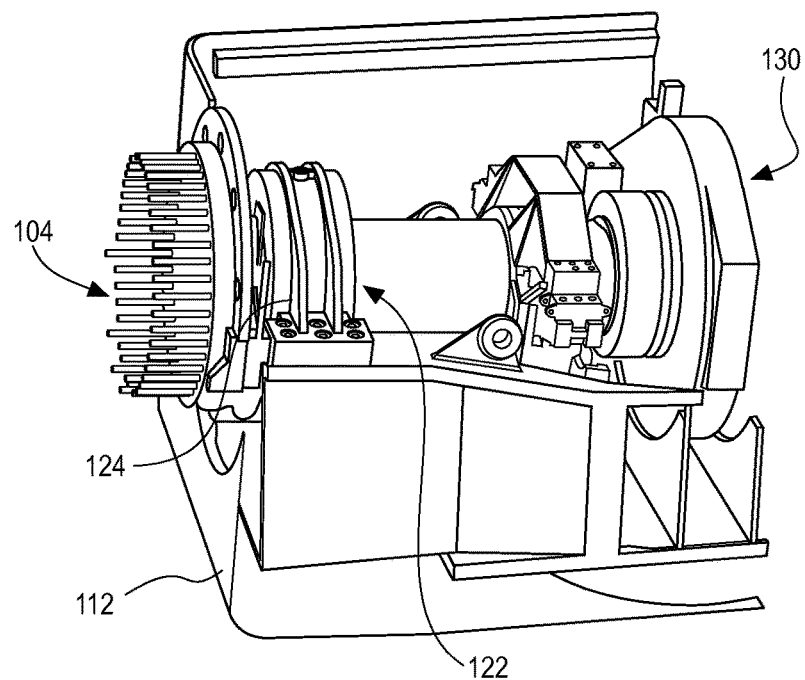
FIG. 5 illustrates a first top perspective of an embodiment of a gear train with an embodiment of a main shaft rotational element installed, in accordance with an embodiment of the disclosure.
Figure 6:
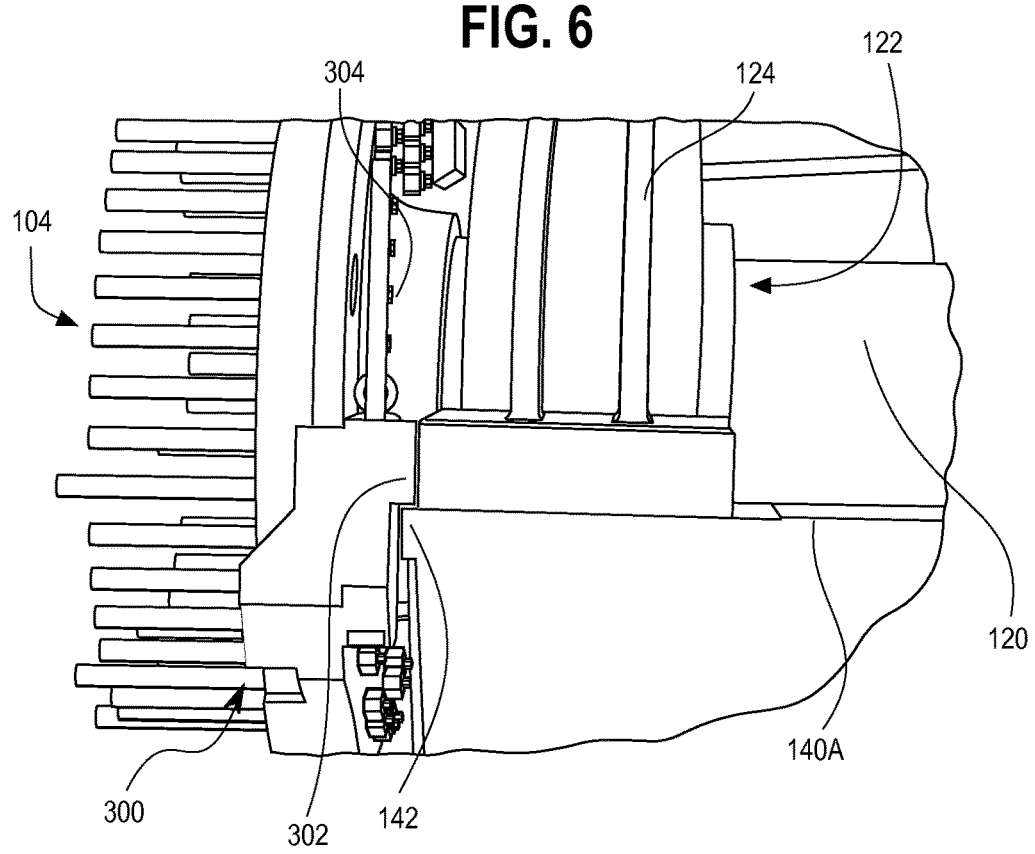
FIG. 6 illustrates an enhanced side perspective view of the gear train and main shaft rotational element installed of FIG. 5.
Figure 7:
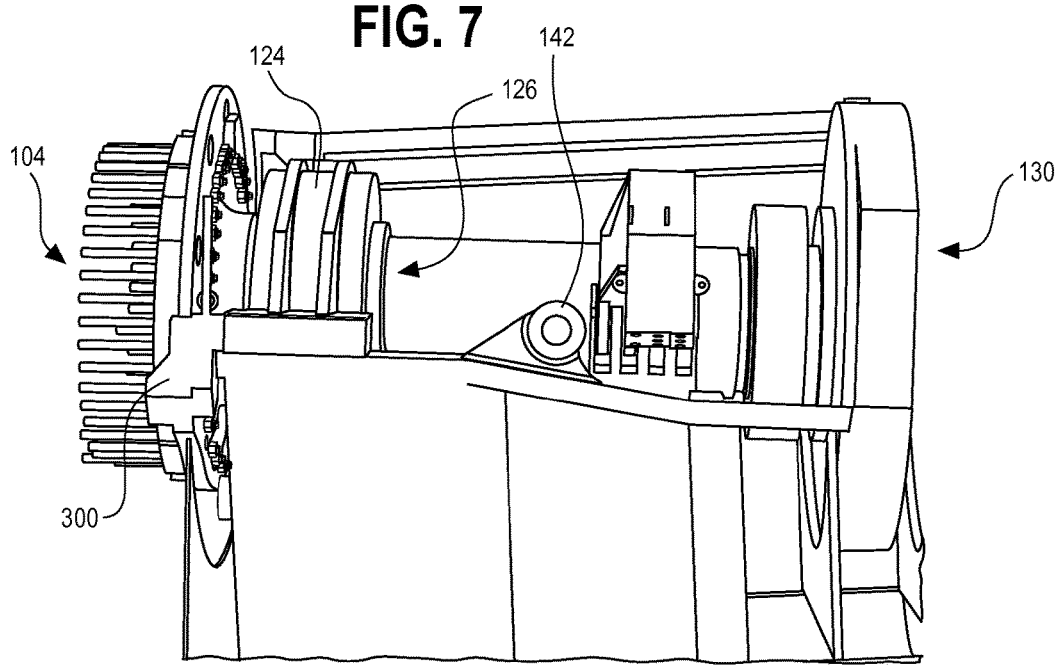
FIG. 7 illustrate a side perspective view of the gear train and main shaft rotational element of FIG. 5.
Figure 8:
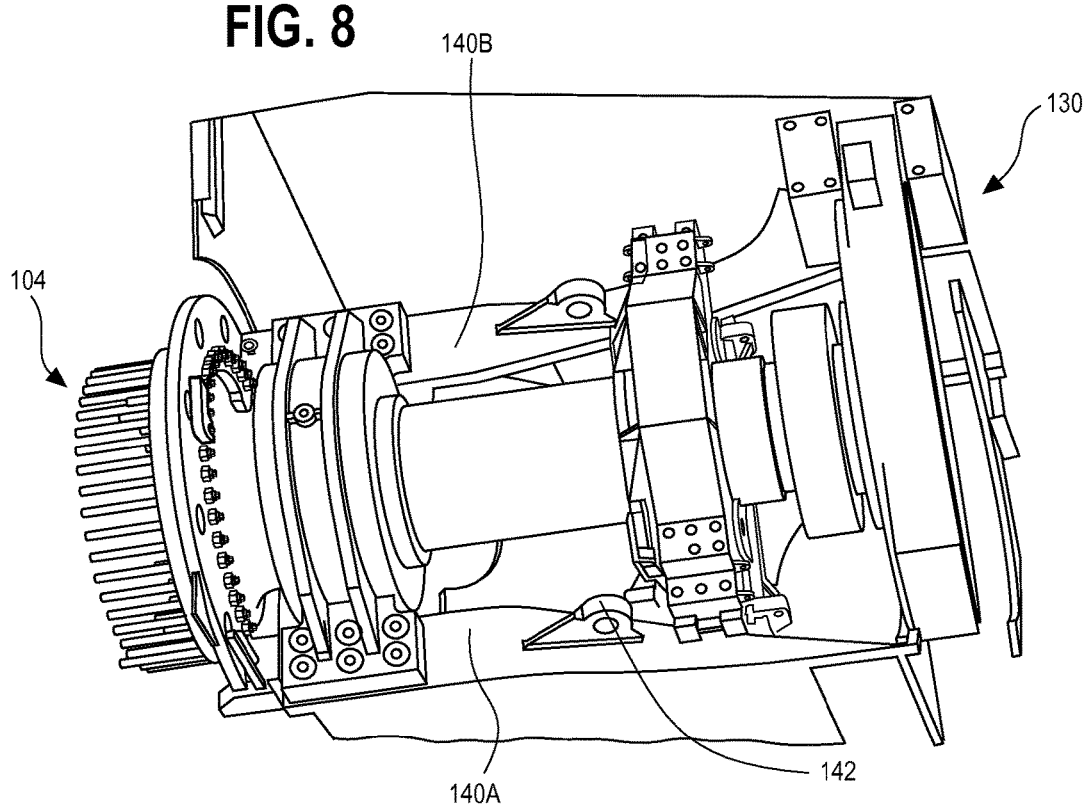
FIG. 8 illustrates a second top perspective view of the embodiment of the gear train and main shaft rotational element of FIG. 5.
Figure 9:
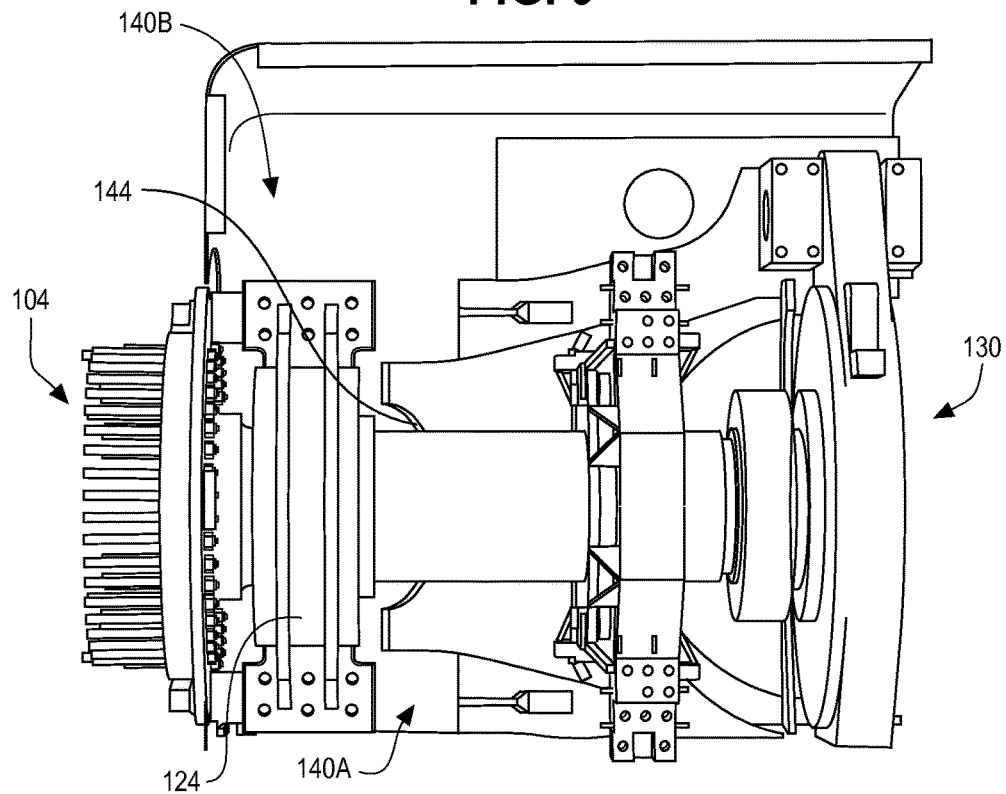
FIG. 9 illustrates a top view of the embodiment of the gear train and main shaft rotational element of FIG. 5.
Figure 10:
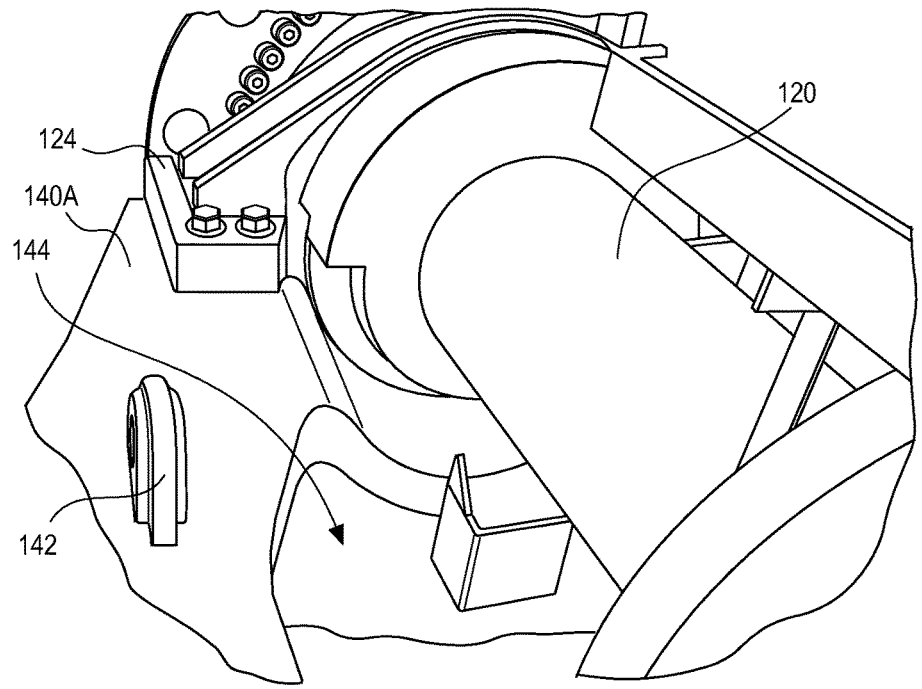
FIG. 10 illustrates a rear perspective view of a gear train in accordance with the disclosure.
Figure 11:
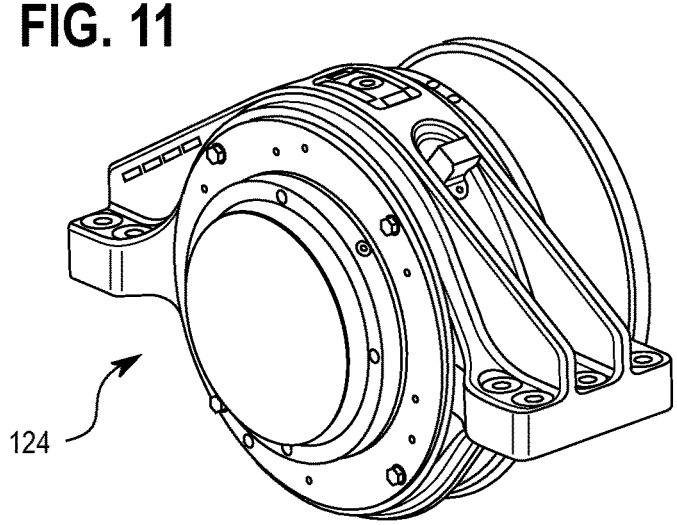
FIG. 11 illustrates a perspective view of a main bearing housing in accordance with an embodiment of the disclosure.

With reference now to FIGS. 1-3, the uptower region of a wind turbine 100 includes a nacelle housing 110 with a nacelle roof 112, illustrated in FIG. 1 between a closed and retracted position. The nacelle roof 112 may be moved between the closed and retracted position by unfastening or unbolting using known or to be discovered equipment. Once nacelle roof 112 is in its retracted position, maintenance may be performed on components housed within nacelle housing 110 A hub 104 is also provided, from which a plurality of turbine blades 102 project from. Housed within nacelle 110 is a main gear shaft 120 which extends from a hub 104 through nacelle 110 and is connected to gearbox 130, which may be provided to increase the rotational speed of shaft 120 for an electricity generator (not illustrated). In its most basic operation, turbine 100 is operable to generate electricity from wind forcibly displaying turbine blades 102 into an angular rotation, due to the tilted nature of blades 102, thereby rotating hub 104 and shaft 120. A generator may then utilize the mechanical and rotational energy of shaft 120, through gearbox 130, for generation of electricity. The weight of these components, in addition to the forces exerted by the wind and the resulting rotational forces of shaft 120, requires that shaft 120 be situated within a main bearing 122 to permit free rotation. The main bearing 122 may be situated inside a main bearing housing 124, which may itself be secured or grounded to the nacelle housing 110. Nacelle housing 121 therefore provides an enclosure for protecting components held within, such as bearing 122 and gearbox 130, as well as additional components which may be shown or described herein.

The interior of the nacelle housing 110 may be accessed via a retracting nacelle roof 112. One method or system for retracting nacelle roof 112 utilizes a crane 200 which may be installable or mountable proximate to the uptower components. In the illustrated embodiment, a jib crane 200 may be installed on top of nacelle housing 110 through any known or to be discovered means of fastening or attaching, including but not limited to, threaded fasteners, clamps, adhesives, friction fit, suction or pressure fit, or any combination thereof. One embodiment of crane 200 is illustrated in FIG. 2. Crane 200 may be sectioned or divided into multiple components and assembled uptower. For instance, in one embodiment crane 200 may be divisible into components weighing no more than approximately fifty pounds. Crane 200 may have a lifting or load capacity of at least 1000 kg in order to properly lift and manipulate uptower components, in accordance with the disclosure.

In some embodiments, an assist or smaller crane (not illustrated) may be first installed uptower on or proximate to nacelle housing 110, for instance on a gearbox pillow block. The assist crane may be sectionable into components of about 50 lbs or less, and may be elevated uptower into position. Once installed uptower, assist crane may then be utilized to lift and manipulate components of crane 200 in order to install crane 200 uptower. Assist crane may have a lifting or load capacity of at least 500 kg, which may facilitate installation of embodiments of crane 200 which are not divisible into smaller components, although a substantially lower lifting capacity is contemplated within the disclosure particularly as discussed above in embodiments where crane 200 is divisible into 50 lbs or lighter segments. Thus, in an embodiment of the disclosure, assist crane may have a lifting load capacity of at least 20 kgs and preferably at least 500 kgs. In embodiments of the disclosure including assist crane, assist crane may be mounted uptower proximate to one portion of nacelle housing 110 while crane 200 is mounted and installed proximate to another portion of nacelle housing 110. For instance, assist crane may be mounted on gearbox pillow block while crane 200 may be mounted on another pillow block. Both crane 200 and the assist crane may be installed after nacelle roof 112 is placed into its retracted position.

As illustrated in FIGS. 4-11, when crane 200 is installed, and the components within nacelle housing 110 are accessible, for example through a retracted nacelle roof 112 as described herein in an embodiment of the disclosure, a main shaft rotational lock or fixation element 300 may be provided in order to rotationally lock main shaft 120 from rotating during replacement of uptower components, including main bearing 122. A lifting device (illustrated as pistons 220 in FIG. 4) may also be provided in order to lift shaft 120 to a clearance height which may be approximately one inch, to install a replacement component, which may be a replacement main bearing as described herein in accordance with one embodiment. The lifting height should be sufficient to create a clearance between main bearing 122 and bed plate 144. In the illustrated embodiment, lifting device may be one or more hydraulic pistons 220, which are illustrated as positionable underneath shaft 120 in order to push shaft 120 upwards thereby elevating shaft 120 to a clearance height. Alternative positions for pistons 220 are contemplated within the disclosure including, for example, above shaft 120 in order to lift or pull shaft 120 upwards.

In the illustrated embodiment, main shaft locking element 300 is provided to secure shaft 120 thereby preventing, or at least restricting, rotation of shaft 120 during uptower replacements of various turbine components, such as replacement of main bearing 122, when the locking element 300 is in an installed position. Locking element may be secured to both shaft 120, which is freely rotational, as well as a grounded element, such as a portion of nacelle housing 110, thereby restricting or preventing rotation of shaft 120. Locking element 300 may be dimensioned and shaped to fit at least partially around shaft 120 and is positionable, in the illustrated embodiment, between hub 104 and main bearing housing 124. Dimensioning locking element 300 to extend further around shaft may thereby provide greater surface area from which fasteners 304 may be provided to attach to hub 104. In one embodiment, locking element 300 is circumferentially extends about approximately half of shaft 120 when locking element 300 is provided in the installed position. A method for installing locking element 300 may include sliding or inserting locking element 300 either above or below shaft 120 and between hub 104 and main bearing housing 124, and then securing locking element 300 to a portion of hub 104 and a portion of nacelle housing 110 by, for instance, fasteners 304. Other shapes and dimensions of locking element 300 are contemplated within the disclosure, and other installation positions of locking element 300 proximate to shaft 120 are contemplated within the disclosure in order to restrict rotation of locking shaft 120 during replacement of turbine components. As a result of installation of locking element 300, main shaft 120 may be restricted from rotating in one or both directions even while turbine 100 experiences wind speeds of 25 meters per second or more.

As main bearing housing 124 is removed in order to replace main bearing 122, positioning of locking element 300 between main bearing housing 124 and hub 104 may accordingly restrict main bearing housing 124 from laterally sliding or moving towards hub 104 after bearing housing 124 has been loosened from the portion of nacelle housing 110 to which bearing housing 124 is secured or grounded to. In another embodiment, main bearing housing may remain in its current position and main bearing 122 may be slid along shaft 120. In yet another embodiment, rotor lock 300 is used to prevent movement of the main shaft due to wind forces being applied to the blades. Main bearing housing 124 may be secured to a bed plate 144, which can be attached to nacelle housing 110 or may be an integral piece of nacelle housing 110. A locking edge or ridge 302 may accordingly be provided on locking element 300 which may contact, or nearly contact, bearing housing 124 in order to restrict lateral movement of bearing housing 124 when locking element 300 is installed. As shown in the illustrated embodiment, locking edge 302 may be an extrusion of locking element 300 which contacts, or nearly contacts, bearing housing 124 when locking element 300 is installed. Additional embodiments of locking edge 302 are contemplated within the disclosure including, for instance, a separate component attached or attachable to locking element 300. Locking edge 302 may be provided on one or multiple portions of locking element 300. In the illustrated embodiment, main bearing housing 124 may be secured to corresponding side surfaces 140A, 140B of bed plate 144. Side surfaces 140A, 140B may be planar or substantially planar at least at the portion of surfaces 140A, 140B in which main bearing housing 124 is attached. Sides surfaces 140A, 140B may terminate at a side surface lip 142, and locking edge 302 may be positionable on or over one or more of side surfaces 140A, 140B in order to contact, or nearly contact, an edge of main bearing housing 124 when locking element is in the installed position. Positioning of locking edge 302 of side surface lip 142 may further operate to restrict rotation of shaft 120 when locking element 300 is installed as a result of side surface lip 142 contacting locking edge 302 thereby interfering with rotation of shaft 120.

Shaft 120 may have a variable diameter with the diameter of shaft 120 greater towards the rear proximate to gearbox 130, thereby inherently restricting movement of bearing housing 124 when it is unsecured from nacelle housing 110. Bed plate 144 may also have attached or integrated components to restrict unwanted sliding of main bearing housing 124. Additionally, portions or components of bed plate 144 may be provided proximate to main bearing housing 124 for contacting, or nearly contacting, main bearing housing 124, aside from the points of connection on side surfaces 140A, 140B, thereby restricting it from laterally moving towards gearbox 130. Bed plate 144 may be extruded from nacelle housing 110 or attached to nacelle housing 110 as a separate installable element. One or more locking eyes 142 may be further provided as a portion of bed plate 144, which may be offset from the removal path of main bearing housing 124.

In order to remove main bearing housing 124, the fasteners connecting main bearing housing 124 to bed plate 144 may be loosened and removed. The main bearing housing may then be forcibly slid along shaft 120 towards gearbox 130. In some embodiments where shaft 120 has a varying diameter, the main bearing housing 124 may be more manipulable when it is slid towards gearbox 130 into an area which may be referenced herein as a removal position of the main bearing housing 124. Main bearing housing 124 may be removed by drilling two holes at a top (or 12 o'clock) position and a bottom (or 6 o'clock) position. Other known methods of cutting are contemplated within the disclosure in order to remove main bearing housing. 124. In order to then remove main bearing 122, heat may be applied from a heat source in order to permit main bearing 122 to slide down shaft 120 in the same direction which main bearing housing 124 may slide to a removal position, as described above. With a space or distance created between shaft 120 and bearing 122 at the removal position where portion of shaft 120 has a smaller diameter, a protective material (not illustrated) may be inserted between bearing 122 and shaft 120 in order to protect shaft 120 as bearing 122 is removed. Bearing 122 may then be removed by a cutting process, with a saw or grinder for instance, or any other known or to be developed method for removing main bearing.

With locking element 300 in its installation position, thereby restricting or securing rotation of main shaft 120 in one or both rotational directions, lifting device 220 may activate in order to lift shaft 120 upwards in order to separate shaft 120 a clearance distance (such as one half inch or more, depending upon size and shape of a component, for instance) from the shaft's operating position. Lifting device 220 may be installed before, after, or simultaneously with locking element 300. In one embodiment, lifting device is attached to locking element 300 and, accordingly, they are installed substantially simultaneously. In the illustrated embodiment, an upper portion of lifting device 210 is secured to hub 104 while a lower portion of lifting device 210 is secured to nacelle housing 110, with at least one hydraulic piston 220 provided between the upper and lower portions of lifting device. Actuation of piston 220 accordingly results in the raising of shaft 120. Accordingly, a method for transferring main shaft 120 from an operation position to a raised position may include securing main shaft 120 from rotating using locking element 300, removing main bearing housing 124, and forcibly lifting shaft 120 using lifting device 220. As should be appreciated by those skilled in the art, in embodiments where main bearing housing 124 is removed from shaft 120 in the raised position of shaft 120, components such as connecting edge 302, portions of bed plate 144, and the increased diameter of main shaft 120 operate to restrict bearing housing 124 from uncontrollably sliding longitudinally along shaft 120 which may potentially damage turbine components such as gear box 130 or hub 104.

Once main bearing 122 and main bearing housing 124 are removed from main shaft 120, inspection as well as possible maintenance of main shaft 120 may be conducted. Over the course of operation, main shaft 120 may experience surface, or near-surface, damage such as macro pitting, which may be described as the development of pits at or near the surface of main shaft 120. These pits may develop, for example, as result of fretting, a process which occurs due to contact between the main bearing 122 and main shaft 120 during operation. Accordingly, repair of main shaft 120 may include repairing the pits or other surface damage to main shaft 120. Additionally, the outer diameter of main shaft 120 may have become reduced or uneven over the course of operation. As such, the diameter of shaft 120 may be restored to its optimal, outer diameter. Not only may such repairing of main shaft 120 prevent future failure, but it also permits uniform replacement bearings to be installed onto main shaft 120. For instance, if main shaft 120 experiences a reduction in diameter, a custom replacement bearing may be required to accommodate the new diameter.

Figure 12:
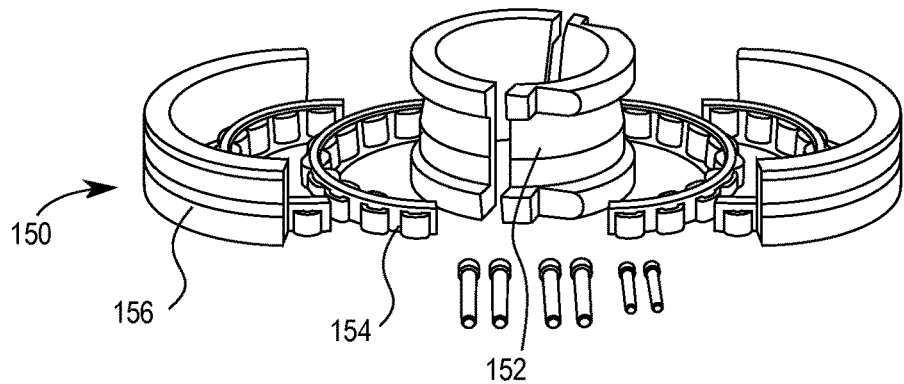
FIG. 12 illustrates a perspective view of an embodiment of a split main bearing in accordance with the disclosure.

An embodiment of split main bearing 150 is illustrated in FIG. 12. Split main bearing comprises a first inner race or component 152, at least one set of rollers 154, and a second outer race or component 156. Each component 152, 154, 156 or split main bearing 150 may be provided as semi-circular and mateable pairs of components. Traditional main bearings 122 are comprised of circular components which may be installed by sliding them along shaft 120. In order for this to happen, the gear train must be removed from up its uptower position and the main bearing 122 must be installed a location off-site from the wind turbine. This can be extremely costly and timely. The method described for replacing uptower components of a wind turbine and, more particularly, replacing the main bearing accordingly is cheaper and more cost effective as the entire process occurs uptower. By removing main bearing 122 and installing split bearing 150, replacement can occur uptower without the need to remove the entire gear train.

Figure 13:
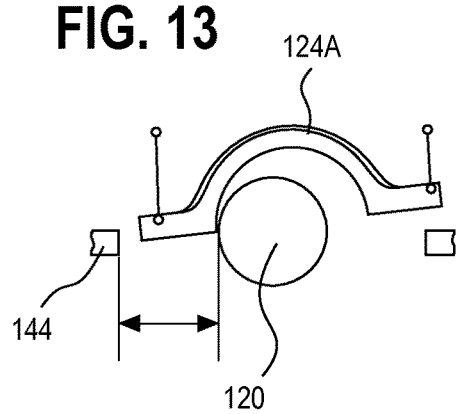
FIG. 13 illustrates a rear view of an installation of a new main bearing housing in accordance with the disclosure.

With reference now to FIG. 13, a main bearing housing 124 may be installed by positioning a lower or first portion 124A of main bearing housing 124B on shaft 120 in or proximate to the installation area of shaft 120 where shaft 120 has a smaller diameter. Once positioned over shaft 120, the first portion 124A may be rotated in order to position it on the bottom of shaft 120. A second or top portion 124B may then be installed on top of shaft 120 and the two portions 124A/124B may be connected or joined and slid back into its operating position, where it may be attached to bed plate 144. In order to facilitate rotation of lower portion 124B, there may be a designed separation distance from the sidewalls 140A/140B, nacelle housing 110, bed plate 144, and other components which are laterally proximate to shaft 120. In one embodiment, shaft 120 and bed plate 144 have a clearance distance of approximately 21 inches.

The descriptions set forth above are meant to be illustrative and not limiting, and persons of skill in the art will recognize that various common and known deviations from the above described structures are considered to be within the scope of the disclosed concepts described herein.

What is claimed:

1. A method for performing maintenance of a wind turbine, the wind turbine comprising one or more turbine blades connected to a main shaft and a nacelle housing for enclosing components of the wind turbine including at least a portion of the main shaft and an O-shape main bearing, the main bearing fixable to a stationary position with respect to the main shaft by a main bearing housing formed with a top half bearing housing and a bottom half bearing housing, the method comprising:

installing a rotor lock in order to resist rotation of the main shaft during maintenance of the wind turbine;

providing a lifting device in order to elevate the main shaft to a clearance height;

sliding the main bearing housing over the main shaft prior to removal of the main bearing housing and the O-shape main bearing in order to avoid damaging a position on the main shaft position in which the main bearing is designed to operate;

removing the main bearing housing from the main shaft;

removing the O-shape main bearing from the main shaft by cutting the O-shape main bearing from the main shaft;

installing a split main bearing to the main shaft, the split main bearing consisting of a pair of semicircular inner races, a pair of semicircular outer races, and at least one pair of rollers to rotate between the inner races and the outer races; and installing a replacement bottom portion of the main bearing housing and a replacement top portion of the main bearing housing to hold the split main bearing.

2. The method of claim 1 further comprising affixing a crane to the nacelle housing, the crane operable to maneuver and lift components of the wind turbine.

3. The method of claim 2, wherein the crane is sectionable into components and, wherein said affixing further comprises assembling the components of the crane uptower.

4. The method of claim 1, wherein the rotor lock circumscribes at least a portion of the main shaft when installed.

5. The method of claim 4, wherein the rotor lock is installed between the turbine blades and the main bearing housing.

6. The method of claim 1, wherein the clearance height is greater than one half inch.

7. The method of claim 1 further comprising removing the main bearing housing prior to removing the main bearing and providing a replacement main bearing housing for holding the installed split main bearing.

8. The method of claim 7, further comprising repairing the main shaft after the main bearing and main bearing housing are removed, and before the replacement bearing housing and the split main bearing are installed.

9. The method of claim 8, wherein repairing the main shaft includes repairing damage to the main shaft in order to reestablish an operating outer diameter of the main shaft.

10. The method of claim 1, wherein the installing a rotor lock, the providing a lifting device, the removing the main bearing housing, the removing the main bearing, the installing a split main bearing, and the installing a replacement bottom portion of main bearing housing and a replacement top portion of the main bearing housing occur uptower on the wind turbine.

11. The method of claim 1, wherein said installing the split main bearing comprises installing the bottom portion of a replacement bearing housing, securing the pair of semicircular inner races about the main shaft, positioning the pair of at least one pair of rollers about the semicircular inner races, and securing the pair of semicircular outer races about the at least one pair of rollers thereby securing the semicircular inner races, the at least one pair of rollers, and the semicircular outer races together about the main shaft, lowering the main shaft, and installing a top half of the replacement bearing housing.

12. The method of claim 1, further comprising affixing a first crane and an additional crane on the nacelle housing, the first crane and the additional crane operable to maneuver and lift components of the wind turbine.

13. The method of claim 12, wherein the first crane is utilized for lifting and positioning the additional crane.

14. The method of claim 13, wherein the additional crane is divisible into components, and wherein the first crane is operable to lift and position the components in order to assemble the additional crane.

15. The method of claim 14, wherein the components of the additional crane individually weigh 50 lbs or less.

16. A method for performing maintenance of a wind turbine, the wind turbine comprising one or more turbine blades connected to a main shaft and a nacelle housing for enclosing components of the wind turbine including at least a portion of the main shaft and an O-shape main bearing, the main bearing fixable to a stationary position with respect to the main shaft by a main bearing housing formed with a top half bearing housing and a bottom half bearing housing, the method comprising:

affixing a first crane to the nacelle housing, the first crane sectionable into components;

affixing a second crane to the nacelle housing, portions of the second crane lifted into place using the affixed first crane, the second crane operable to maneuver and lift components of the wind turbine;

installing a rotor lock between the turbine blades and the main bearing housing in order to resist rotation of the main shaft, the installed rotor lock circumscribing at least a portion of the main shaft;

providing a lifting device in order to elevate the main shaft to a clearance height;

sliding the main bearing housing over the main shaft prior to removal of the main bearing housing and the O-shape main bearing in order to avoid damaging a position on the main shaft position in which the main bearing is designed to operate;

removing the main bearing housing from the main shaft;

removing the O-shape main bearing from the main shaft by cutting the O-shape main bearing from the main shaft;

installing a split main bearing to the main shaft, the split main bearing consisting of a pair of semicircular inner races, a pair of semicircular outer races, and at least one pair of rollers to rotate between the inner races and the outer races; and installing a replacement bottom portion of the main bearing housing and a replacement top portion of the main bearing housing for holding the split main bearing, wherein said installing a rotor lock, said providing a lifting device, said removing the main bearing housing, said removing the main bearing, said installing a split main bearing, and said installing said replacement bottom portion of the main bearing housing and said replacement top portion of the main bearing housing occur up tower on the wind turbine.

17. The method of claim 16, wherein the components of the first crane each weigh about 50 lbs or less.

18. The method of claim 16, further comprising repairing the main shaft after removing the main bearing, and before installing a split main bearing.

* * * * *